US012075721B2

(12) United States Patent
Thompson et al.

(10) Patent No.: US 12,075,721 B2
(45) Date of Patent: Sep. 3, 2024

(54) SYSTEMS AND METHODS FOR DOWNFORCE CONTROL FOR AN IMPLEMENT

(71) Applicant: CNH Industrial Canada, Ltd., Saskatoon (CA)

(72) Inventors: Dennis George Thompson, Eagle Ridge (CA); Nicholas George Alfred Ryder, Saskatoon (CA)

(73) Assignee: CNH Industrial Canada, Ltd. (CA)

( * ) Notice: Subject to any disclaimer, the term of this patent is extended or adjusted under 35 U.S.C. 154(b) by 561 days.

(21) Appl. No.: 17/332,956

(22) Filed: May 27, 2021

(65) Prior Publication Data

US 2022/0377967 A1 Dec. 1, 2022

(51) Int. Cl.
*A01C 7/20* (2006.01)
*A01C 5/06* (2006.01)

(52) U.S. Cl.
CPC .............. *A01C 7/203* (2013.01); *A01C 5/064* (2013.01)

(58) Field of Classification Search
CPC .......... A01C 7/203; A01C 5/064; A01C 5/06; A01C 7/205; A01C 5/068; A01C 7/06; A01C 7/105; A01C 7/102; A01C 23/007; A01B 63/008; A01B 79/005; A01B 63/111

See application file for complete search history.

(56) References Cited

U.S. PATENT DOCUMENTS 8,577,561 B2 11/2013 Green et al.
8,634,992 B2 1/2014 Sauder et al.
(Continued)

FOREIGN PATENT DOCUMENTS

CN 110320941 A 10/2019
WO WO 2019010239 1/2019
(Continued)

OTHER PUBLICATIONS

Jing et al., Development and performance evaluation of an electro-hydraulic downforce control system for planter row unit, Nov. 5, 2019, Computers and Electronics in Agriculture 172 (2020), pp. 1-8 (Year: 2019).*
(Continued)

*Primary Examiner* — Sze-Hon Kong
(74) *Attorney, Agent, or Firm* — Rebecca Henkel; Peter K. Zacharias; Rickard K. DeMille (57) ABSTRACT

In one aspect, a system for providing downforce control includes a seeder including a plurality of row units. One or more actuators are operably coupled with the plurality of row units and configured to adjust a downforce of the plurality of row units. A sensor is configured to detect one or more seeding parameters. A computing system is configured to control the operation of the plurality of row units. The computing system is further configured to receive an input associated with a target depth range of the row unit into an underlying field, receive data related to one or more seeding parameters, receive data related to an actual seeding depth; generate a command signal based on a differential between the actual seeding depth and the target depth range; and generate a force command for the one or more actuators to adjust a downforce of the plurality of row units.

19 Claims, 7 Drawing Sheets

(56) References Cited

U.S. PATENT DOCUMENTS

| | | |
|---|---|---|
| 8,763,713 B2 | 7/2014 | Bassett |
| 8,910,582 B2 | 12/2014 | Mariman et al. |
| 9,144,189 B2 | 9/2015 | Stoller et al. |
| 9,173,339 B2 | 11/2015 | Sauder et al. |
| 9,288,937 B2 | 3/2016 | Sauder et al. |
| 9,307,688 B2 | 4/2016 | Adams et al. |
| 9,675,004 B2 | 6/2017 | Landphair et al. |
| 10,045,474 B2 | 8/2018 | Bachman et al. |
| 10,299,424 B2 | 5/2019 | Hamilton |
| 10,308,116 B2 | 6/2019 | Czapka et al. |
| 10,362,726 B2 | 7/2019 | Zielke |
| 10,412,881 B1* | 9/2019 | Houck .................. A01B 49/06 |
| 10,548,260 B2 | 2/2020 | Bassett |
| 10,582,653 B2 | 3/2020 | Bassett |
| 11,667,171 B2* | 6/2023 | Birkland ................ B62D 6/006 701/36 |
| 2010/0319941 A1 | 12/2010 | Peterson |
| 2013/0032363 A1 | 2/2013 | Curry et al. |
| 2014/0026748 A1 | 1/2014 | Stoller et al. |
| 2017/0142897 A1 | 5/2017 | Hagny et al. |
| 2017/0169523 A1* | 6/2017 | Xu .......................... A01C 21/00 |
| 2018/0317381 A1* | 11/2018 | Bassett .................. A01C 7/205 |
| 2019/0045703 A1* | 2/2019 | Bassett .................. A01C 5/066 |
| 2019/0075710 A1 | 3/2019 | Strnad et al. |
| 2019/0110388 A1* | 4/2019 | Gresch ..................... A01C 7/20 |
| 2019/0116719 A1 | 4/2019 | Fletcher et al. |
| 2019/0124824 A1 | 5/2019 | Hubner et al. |
| 2019/0183036 A1* | 6/2019 | Leimkuehler .......... A01C 5/062 |
| 2019/0254223 A1 | 8/2019 | Eichhorn et al. |
| 2019/0297774 A1 | 10/2019 | Hamilton |
| 2019/0373797 A1 | 12/2019 | Schoeny et al. |
| 2019/0380259 A1 | 12/2019 | Frank et al. |
| 2020/0045869 A1* | 2/2020 | Stanhope ............... A01C 7/205 |
| 2020/0053944 A1 | 2/2020 | Sivinski |
| 2020/0060068 A1* | 2/2020 | Stanhope ............... A01B 76/00 |
| 2020/0154626 A1 | 5/2020 | Schoeny et al. |
| 2020/0281107 A1 | 9/2020 | Stanhope |
| 2020/0281111 A1* | 9/2020 | Walter .................... A01C 5/068 |
| 2021/0190754 A1* | 6/2021 | Stoller ................... G01N 33/24 |
| 2021/0274700 A1* | 9/2021 | Birkland .............. G01P 15/0802 |
| 2022/0000002 A1* | 1/2022 | Bassett ................ A01B 61/048 |
| 2022/0000051 A1* | 1/2022 | Geltner .................... A01G 7/06 |
| 2022/0142039 A1* | 5/2022 | Eichhorn .............. A01B 63/111 |
| 2022/0346304 A1* | 11/2022 | Allgaier ................. A01C 7/203 |

FOREIGN PATENT DOCUMENTS

| | | |
|---|---|---|
| WO | WO 2019169369 | 9/2019 |
| WO | WO 2020008283 | 1/2020 |

OTHER PUBLICATIONS

Li et al., "Precise Active Seeding Downforce Control System Based on Fuzzy PID", China Agricultural University, Beijing, China. Published May 12, 2020. (10 pages).

Precision Planting, "Down Force Metrics—Display Margin, Ground Contact, and Weigh Pin Readings." Agricultural Control and Monitoring, Help Center, dated Jun. 22, 2020. (8 pages) https://2020.ag/help-center/en_US/down-force-metrics/.

Sharda et al., "Planter Downforce Technology for Uniform Seeding Depth", Kansas State University Agricultural Experiment Station and Cooperative Extension Service, dated Mar. 2017 (8 pages).

Deere & Company, "SeedStarXP Planter Quick Reference Guide", dated May 17, 2012. (4 pages) https://www.deere.com/assets/pdfs/common/qrg/planting-seedstar-2-xp.pdf.

* cited by examiner

SYSTEMS AND METHODS FOR DOWNFORCE CONTROL FOR AN IMPLEMENT

FIELD OF THE INVENTION

The present subject matter relates generally to work vehicles and, more particularly, to a system and method for providing downforce control for an implement operably coupled with a work vehicle.

BACKGROUND OF THE INVENTION

A wide range of agricultural implements are known, are presently in use, and are particularly designed for towing behind a work vehicle, such as a tractor. For example, planting implements, such as seeders or planters, typically include multiple row units distributed across a width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a furrow closing system that closes the seed trench.

Using conventional control systems, an operator typically manually adjusts a downforce of the seeder to control the desired depth of the seeds being deposited by the row units and/or to otherwise adjust the seeder productivity. For instance, this often takes the form of the operator manually inputting a downforce based on various seeding parameters. However, actual results may vary based on a variance between real-time seeding parameters and projected seeding parameters. Moreover, with an inexperienced operator, the operator may manually adjust the downforce of the seeder to an amount that does not provide for optimal planting productivity and/or efficiency.

Accordingly, a system and method for providing implement-based downforce control that allows the amount of downforce provided by the implement to be automatically adjusted by a computing system would be welcomed in the technology.

BRIEF DESCRIPTION OF THE INVENTION

Aspects and advantages of the invention will be set forth in part in the following description, or may be obvious from the description, or may be learned through practice of the invention.

In some aspects, the present subject matter is directed to a system for providing downforce control. The system includes a seeder including a plurality of row units. Each row unit is configured to deposit seeds within a ground as the seeder traverses a field. One or more actuators is operably coupled with each of the plurality of row units and configured to adjust a downforce of the plurality of row units. A sensor is configured to detect one or more seeding parameters. A computing system is provided in operative association with the seeder. The computing system is configured to control the operation of the plurality of row units. The computing system is further configured to receive an input associated with a target depth range of an implement into an underlying field; receive data related to one or more seeding parameters and an actual seeding depth; monitor one or more seeding parameters as the seeder traverses the field; when the actual seeding depth deviates from a defined range, generate a command signal based a differential between the actual seeding depth and the target depth range; and generate a force command for the one or more actuators to adjust a downforce of the plurality of row units, wherein the force command is based at least in part on the command signal and the one or more seeding parameters.

In some aspects, the present subject matter is directed to a method for providing downforce control for an agricultural implement including a computing system. The method includes receiving an input associated with a target depth range of a row unit into an underlying field. The method also includes receiving data related to a seeding parameter and an actual seeding depth. In addition, the method includes monitoring the actual seeding depth relative to the target depth range. When the actual seeding depth deviates from a defined range, the method includes generating a command signal based on a differential between the actual seeding depth and the target depth range. The method further includes generating a force command for one or more actuators to adjust a downforce of the row unit. The force command is based at least in part on the command signal. Additionally, the method includes generating a variable gain based at least in part on the seeding parameter, adjusting a magnitude of the force command based on the variable gain thereby generating an adjusted force command. Lastly, the method includes providing the adjusted force command to the actuator to adjust the downforce of the row unit.

In some aspects, the present subject matter is directed to a method for providing downforce control for a seeder having a plurality of row units. The seeder includes a computing system configured to control an operation of the plurality of row units. The method includes receiving an input associated with a target depth range of the row unit into an underlying field and a sensitivity setting. The method also includes receiving data related to a speed of the seeder and an actual seeding depth. In addition, the method includes monitoring the actual depth relative to the target depth range. When the actual seeding depth deviates from a defined range, the method includes generating a command signal based on a differential between the actual seeding depth and the target depth range. Further, the method includes generating a force command for one or more actuators to adjust a downforce of the plurality of row units. The force command is based at least in part on the command signal. Additionally, the method includes generating a variable gain based at least in part on a seeder speed and adjusting a magnitude of the force command based on the variable gain thereby generating an adjusted force command. Lastly, the method includes providing the adjusted force command to the one or more actuators to adjust a downforce of the plurality of row units.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In general, the present subject matter is directed to systems and related methods for adjusting downforce on a disc opener of a seeder. The seeder may be configured, for example, to include a plurality of row units ganged together via an associated toolbar and rockshaft of the seeder. Additionally, in several embodiments, the system may include one or more disc openers configured to penetrate the ground to form a furrow or trench for the deposition of seeds therein, with each disc opener being coupled to a frame member or backbone of an associated row unit of the seeder. The system may also include a depth adjustment assembly provided in operative association with each row unit that is configured to control a penetration depth of the disc opener and an actuator configured to apply a down pressure load on the ganged disc openers to ensure that each disc opener penetrates the ground to the desired depth set by the depth control assembly.

Furthermore, the system may include one or more sensors configured to detect one or more seeding parameters. For example, the seeding parameter(s) may include a soil compaction level, a soil percent moisture, a field residue levels/amounts, an opener movement (e.g., ride quality, a minimum ground contact percentage), a field traffic, a weight of a work vehicle or the implement, a soil type, a soil composition, a topsoil depth, a subsoil depth, a field elevation, a tire traction, sensor data from one or more load sensors, a seeder speed, and/or any other suitable condition that affects the performance of a seeder to deposit one or more seeds at a target deposition depth or target depth range.

A computing system is provided in operative association with the seeder. The computing system is configured to control the operation of the plurality of row units. In addition, the computing system is further configured to receive an input associated with a defined target range for a seeding depth of the seeder, receive data related to an actual depth of the seeder as the seeder traverses a field, and monitor one or more seeding parameters as the seeder traverses the field. When the actual seeding depth deviates from a defined range, the computing system may be configured to generate a command signal based at least in part on the seeding parameter. Further, the computing system may be configured to provide a force command to the one or more actuators to adjust a downforce of the plurality of row units based at least in part on the command signal.

In some instances, the computing system is further configured to generate a variable gain based at least in part on the seeding parameter. The variable gain can modulate a gain of a band-pass filter. In addition, the computing system may be configured to adjust a magnitude of the command signal thereby generating an adjusted command signal. In such instances, the force command is based at least in part on the adjusted command signal. In some examples, the amount of variable gain is at least partially varied based on one or more predefined sensitivity settings. Additionally or alternatively, the amount of variable gain is at least partially varied based on an implement or vehicle speed, or any other seeding parameter.

Use of the disclosed systems and methods allows for an agricultural implement to automatically adjust downforce settings based on seeding parameters to optimize system performance in variable field conditions, reduce the need for an experienced operator to establish an initial downforce target setting, and support autonomous seeding and planting initiatives. The disclosed systems and methods may also allow eliminate the need for operator adjustment during field operation by continually or intermittently adjusting for optimum performance and overall productivity. In some instances, by optimizing performance, the disclosed system and method may lead to better crop emergence, improve crop yields, and reduce machine draft via optimized downforce, which reduces fuel consumption, among other benefits.

Figure 1:
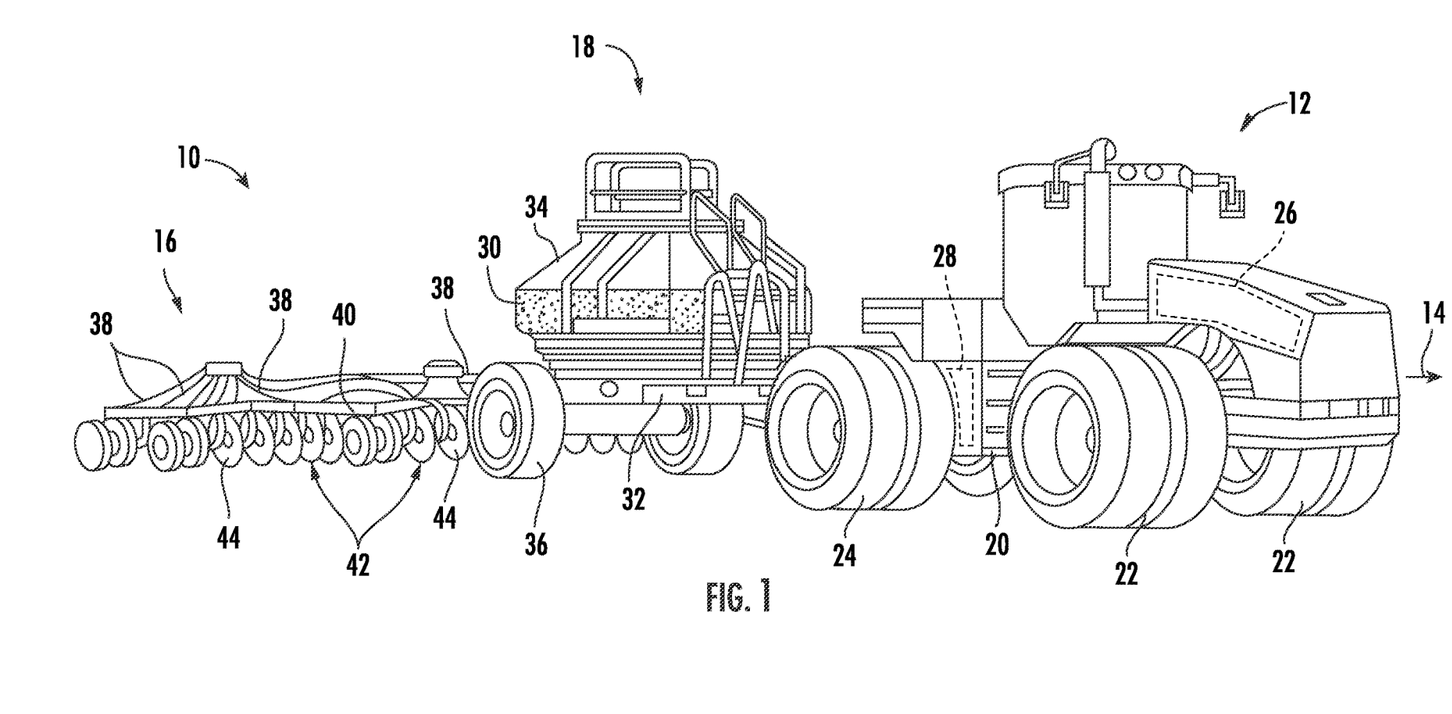
FIG. 1 illustrates a perspective view of an agricultural implement coupled to a work vehicle in accordance with aspects of the present subject matter.

Referring now to the drawings, FIG. 1 illustrates a perspective view of an agricultural implement 10 coupled to a work vehicle 12 in accordance with various aspects of the present disclosure. In general, the vehicle 12 may be configured to tow the implement 10 across a field in a direction of travel (e.g., as indicated by arrow 14 in FIG. 1). As shown in the illustrated example, the implement 10 is configured as a seed planting implement, specifically, a seeder 16 (e.g., a seed disc drill) and an associated air cart 18, and the vehicle 12 is configured as an agricultural tractor. However, in alternative embodiments, the implement 10 may be configured as any other suitable type of implement, such as a planter or another seed-dispensing implement, a side dresser or another fertilizer-dispensing implement, a strip tiller, a tillage implement (e.g., a disc harrow), and/or the like. Similarly, the vehicle 12 may be configured as any other suitable type of vehicle, such as an agricultural harvester, a self-propelled sprayer, and/or the like.

As shown, the vehicle 12 may include a frame 20 or chassis configured to support or couple to a plurality of components. For example, a pair of steerable front wheels 22 and a pair of driven rear wheels 24 (one is shown) may be coupled to the frame 20. The wheels 22, 24 may be configured to support the vehicle 12 relative to the ground and move the vehicle 12 in the direction of travel 14 across the field. However, in alternative embodiments, the front wheels 22 may be driven in addition to or in lieu of the rear wheels 24. Moreover, in further embodiments, the vehicle 12 may include track assemblies (not shown) in place of the front and/or rear wheels 22, 24.

Furthermore, the vehicle 12 may include one or more devices for adjusting the speed at which the vehicle 12 moves across the field in the direction of travel 14. Specifically, in several embodiments, the work vehicle 12 may include an engine 26 and a transmission 28 mounted on the frame 20. In general, the engine 26 may be configured to generate power by combusting or otherwise burning a mixture of air and fuel. The transmission 28 may, in turn, be operably coupled to the engine 26 and may provide variably adjusted gear ratios for transferring the power generated by the engine 26 to the driven wheels 24. For example, increasing the power output by the engine 26 (e.g., by increasing the fuel flow to the engine 26) and/or shifting the transmission 28 into a higher gear may increase the speed at which the vehicle 12 moves across the field. Conversely, decreasing the power output by the engine 26 (e.g., by decreasing the fuel flow to the engine 26) and/or shifting the transmission 28 into a lower gear may decrease the speed at which the vehicle 12 moves across the field.

Referring still to FIG. 1, the air cart 18 may be configured to be towed behind the work vehicle 12, with the seeder 16 being towed behind the air cart 18. In this regard, a first hitch assembly may couple the air cart 18 to the work vehicle 12, and a second hitch assembly may couple the seeder 16 to the air cart 18. However, in other embodiments, the seeder 16 may be towed behind the work vehicle 12, with the air cart 18 towed behind the seeder 16. In various embodiments, the air cart 18 and the seeder 16 may be part of a single unit that is towed behind the work vehicle 12, or elements of a self-propelled vehicle configured to distribute agricultural product across a field.

In several embodiments, the air cart 18 may be configured to store a flowable granular or particulate-type agricultural product 30, such as seeds, fertilizer, and/or the like, to be deposited within the soil. For example, the air cart 18 may include a frame 32 configured to support or couple to various components of the air cart 18. For instance, as shown, the frame 32 may be configured to support a hopper or storage tank 34 configured for storing the agricultural product 30 to be deposited within the furrow. Furthermore, a plurality of wheels 36 may be coupled to the frame 32 to permit the air cart 18 to be towed across a field by the work vehicle 12. Additionally, a plurality of delivery conduits 38 may be configured to convey the agricultural product 30 from the air cart 18 to the seeder 16 for deposition into the furrow.

Moreover, in several embodiments, the seeder 16 may include a toolbar 40 configured to support or couple to various components of the seeder 16, such as one or more ground engaging tools in the form of one or more row units 42. As will be described below, each row unit 42 may include one or more disc openers 44 of an associated furrow-opening assembly 72 (FIG. 2), with each disc opener 44 configured to excavate a furrow or trench in soil to facilitate deposition of the flowable granular or particulate-type agricultural product 30. It should be appreciated that the seeder 16 may generally include any number of row units 42 to facilitate delivery of the agricultural product 30 across a given swath of the soil. For instance, in some embodiments, the seeder 16 may include twenty-four row units 42 spaced apart across the width of the seeder 16. In alternative embodiments, however, the seeder 16 may include any other suitable number of row units 42, such as less than twenty-four row units 42 or more than twenty-four row units 42.

Figure 2:
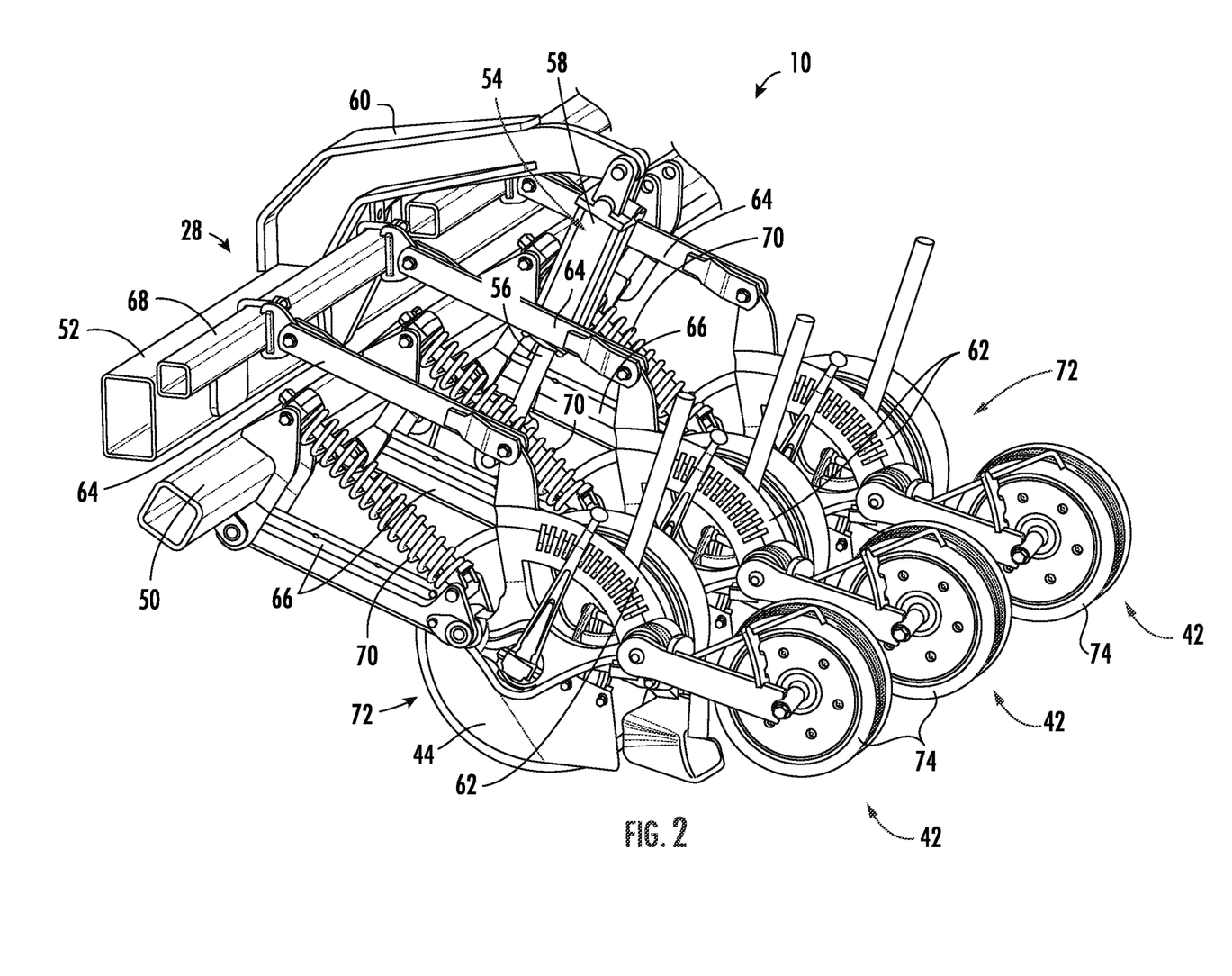
FIG. 2 illustrates an enlarged, partial perspective view of the agricultural implement shown in FIG. 1, particularly illustrating various components of the implement.

Referring now to FIG. 2, an enlarged, perspective view of a portion of the implement 10 shown in FIG. 1 is illustrated in accordance with aspects of the present subject matter. As shown, the implement 10 may include a rockshaft 50 that is moveable relative to a toolbar 40. In this regard, the implement 10 may include an actuator 54 (e.g., a rockshaft cylinder) configured to rotate or otherwise move the rockshaft 50 relative to the toolbar 40. For example, as shown in the illustrated example, a first end portion of the actuator 54 (e.g., a rod 56 of the actuator 54) may be coupled to the rockshaft 50, while a second end portion of the actuator 54 (e.g., a cylinder 58 of the actuator 54) may be coupled to a support arm 60 of the implement 10, which is, in turn, mounted to the toolbar 40. The rod 56 of the actuator 54 may be configured to extend and/or retract relative to the cylinder 58 of the actuator 54 to rotate the rockshaft 50 relative to the toolbar 40, which, in turn, adjusts a downforce being applied to the various row units 42 ganged together via the rockshaft 50. In the illustrated example, the actuator 54 corresponds to a fluid-driven actuator, such as a hydraulic or pneumatic cylinder. However, it should be appreciated that the actuator 54 may correspond to any other suitable type of actuator, such as an electric linear actuator.

In several embodiments, a plurality of the row units 42 of the implement 10 may be ganged together via the toolbar 40 and associated rockshaft 50, with each row unit 42 including a frame member or backbone 62 adjustably coupled to the toolbar 40 and the rockshaft 50 by upper and lower links 64, 66. For example, one end portion of each upper link 64 may be pivotably coupled to the corresponding frame member 62 of the row unit 42, while an opposed end portion of each upper link 64 may be pivotably coupled to a rail 68 of the implement 10, which is, in turn, mounted to the toolbar 40. Similarly, one end portion of each lower link 66 may be pivotably coupled to the corresponding frame member 62, while an opposed end portion of each lower link 66 may be pivotably coupled to the rockshaft 50. In some embodiments, the upper and lower links 64, 66 may be parallel. In several embodiments, each lower link 66 may include a biasing member 70, such as the illustrated spring, coupled between the corresponding frame member 62 and the rockshaft 50 to apply a downforce or pressure through the frame member 62 and the various components coupled thereto. However, it should be appreciated that, in alternative embodiments, each row unit 42 may be coupled to the toolbar 40 and/or the rockshaft 50 in any other suitable manner. For example, the upper and/or lower links 64, 66 may be fixedly coupled to the frame member 62 and/or the links 64, 66 may be non-parallel. Additionally, in further embodiments, the implement 10 may not include the upper and/or lower links 64, 66. In such instance, the implement 10 may include other components for coupling each row unit 42 to the toolbar 40 and/or the rockshaft 50.

As shown in FIG. 2, each row unit 42 may also include a furrow opening assembly 72, a furrow closing assembly, and a press wheel 74. In general, each furrow opening assembly 72 may include the one or more disc openers 44 configured to excavate a furrow or trench in the soil for the deposition of seeds or other agricultural substances therein (e.g., fertilizer). The furrow closing assemblies are not shown to better illustrate the disc openers 44. As is generally understood, each furrow closing assembly may include a closing disc configured to close the furrow after seeds have been deposited into the furrow. Each press wheel 74 may then be configured to roll over the corresponding closed furrow to firm the soil over the seeds and promote favorable seed-to-soil contact.

It should be appreciated that the configuration of the implement 10 and the work vehicle 12 described above and shown in FIGS. 1 and 2 are provided only to place the present subject matter in an exemplary field of use. Thus, it should be appreciated that the present subject matter may be readily adaptable to any manner of implement, work vehicle, and/or hitch assembly configurations.

Figure 3:
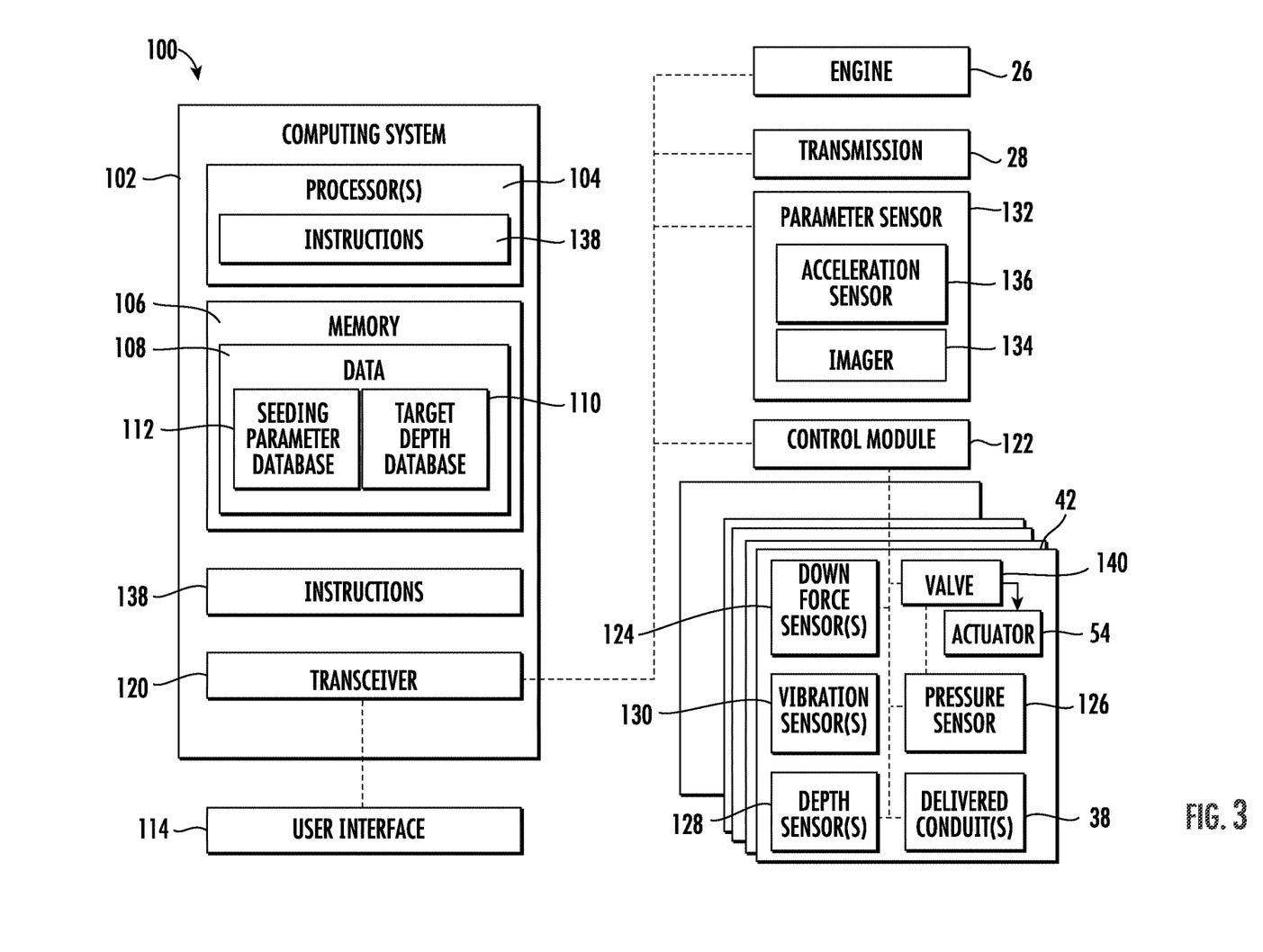
FIG. 3 illustrates a schematic view of a system for providing downforce control in accordance with aspects of the present subject matter.

Referring now to FIG. 3, a schematic view of a downforce monitoring system 100 for an agricultural implement 10 (FIG. 1) is illustrated in accordance with aspects of the present subject matter. In general, the system 100 will be described herein with reference to the work vehicle 12 (FIG. 1) and the seed planting implement 10 (FIG. 1) described above with reference to FIGS. 1 and 2. However, it should be appreciated that the disclosed system 100 may generally be utilized with work vehicles having any suitable vehicle configuration and/or tillage implements have any suitable implement configuration.

In general, the system 100 may include computing system 102. The computing system 102 may include any suitable processor-based device, such as a computing device or any suitable combination of computing devices. In several embodiments, the computing system 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits.

Additionally, the memory device(s) 106 of the computing system 102 may generally include memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 106 may generally be configured to store suitable computer-readable instructions that, when implemented by the processor(s) 104, configure the computing system 102 to perform various computer-implemented functions (e.g., performing the methods, steps, algorithms, calculations and the like disclosed herein). In addition, the computing system 102 may also include various other suitable components, such as a communications circuit or module, one or more input/output channels, a data/control bus, and/or the like.

It should be appreciated that, in several embodiments, the computing system 102 may correspond to an existing controller of the agricultural vehicle 12, the implement 10, or the computing system 102 may correspond to a separate processing device. For instance, in some embodiments, the computing system 102 may form all or part of a separate plug-in module or computing device that is installed relative to the work vehicle 12 or the implement 10 to allow for the disclosed system 100 and method to be implemented without requiring additional software to be uploaded onto existing control devices of the work vehicle 12 or the implement 10.

In several embodiments, the memory 106 of the computing system 102 may include one or more databases 108 for storing information received from components of the system 100 and/or generated by the computing system 102. For example, the memory 106 may include a target depth database 110 and/or a seeding parameter database 112.

In some embodiments, the computing system 102 may be configured to receive and store a seeder control input for a target depth and/or a target depth range within the target depth database 110. In some instances, the target depth and/or the target depth range may be received through a user interface 114 and/or automatically generated based on one or more inputs. In various embodiments, the target depth range may be defined by a product 30 (FIG. 1) to be placed within the field. In general, the user interface 114 may correspond to any suitable input device(s) configured to allow the operator to provide operator inputs to the computing system 102, such as a touch screen display, a keyboard, joystick, buttons, knobs, switches, and/or combinations thereof located within the cab of the work vehicle 12 and/or in any other practicable location (e.g., a remote device).

In various examples, the seeding parameters may include at least one of a soil compaction level, a soil percent moisture, a field residue levels/amounts, an opener movement (e.g., ride quality, a minimum ground contact percentage), a field traffic, a weight of a work vehicle 12 or the implement 10, a soil type, a soil composition, a topsoil depth, a subsoil depth, a field elevation, a tire traction, sensor data from one or more load sensors, a seeder speed, and/or any other suitable condition that affects the performance of a seeder 16 to deposit one or more seeds at a target deposition depth or target depth range. In various examples, each seeding parameter is associated with a defined range, which may be stored in the seeding parameter database 112. The defined ranges may be correlated to the target depth and/or the target depth range. For example, the target depth and/or the target depth range may be maintained with the downforce of the row units 42 at a current setting while the seeder speed is operated within a defined speed range.

In some instances, the computing system 102 may be configured to compare the target depth and/or the target depth range to an actual depth during the operation of the implement 10. When the actual seeding depth deviates from the target depth and/or the target depth range, the computing system 102 can generate remedial instructions to adjust the depth of the implement 10. In general, the operation of the implement 10 is controlled by the computing system 102. One or more parameter sensors can measure each of the seeding parameters. In addition, one or more depth sensors can measure a depth of the seeds. The computing system 102 receives inputs from each of the one or more parameter sensors 132 and/or the one or more depth sensors 128 in the form of data. Upon receiving the data, the computing system 102 can calculate an actual depth and monitor the actual depth relative to the target depth and/or the target depth range. In addition, upon receiving the data, the computing system 102 can monitor each of one or more seeding parameters.

When the actual seeding depth deviates from the target depth and/or the target depth range, the computing system 102 may generate a command signal to move the implement 10 from an actual depth to the target depth and/or target depth range. Next, the computing system 102 uses an algorithm, look-up table, chart, graph, and/or any other method to generate a force command that achieves the target depth and/or the target depth range based on the command signal and the detected seeding parameters. In instances in which a look-up table is implemented, the look-up table may include any array that replaces a runtime computation with an indexing operation. For example, the look-up table may include an array of pre-calculated and indexed implement positions stored in static program storage. As such, the computing system 102 is informed of the current position of the implement 10 when generating the command signal. It should be noted that various control laws such as PI, PID, or other known control laws may be used.

In some instances, the algorithms, look-up tables, charts, graphs, and/or other methods can be implemented using a machine learning engine (MLE) that utilizes one or several machine learning techniques including, for example, decision tree learning, including, for example, random forest or conditional inference trees methods, neural networks, support vector machines, clustering, Bayesian networks and/or any other technique. These algorithms can include computer-executable code that can be retrieved by the memory 106 and/or a remote server through a network/cloud and used to generate a command signal.

In various instances, the computing system 102 provides the force command to a control module 122, which causes various portions of the implement 10 to move to update the implement position. By successively repeating these steps, the computing system 102 utilizes inputs from the one or more parameter sensors and the one or more depth sensors to determine an actual seed depth, and then operates the implement 10 to cause movement of the implement 10 to operate a target depth and/or depth range. Thus, it should be appreciated that the computing system 102 may be configured to implement various control actions to adjust the operation of the implement 10 in a manner that maintains a ground engaging tool to be maintained and/or returned to a target depth and/or a target range.

In some embodiments, a priority of seeding parameters may be defined so that the control system 100 can determine which conditions are more important to establish the optimum force command, which in turn, has a greater effect on the seeding depth. For example, an amount of opener vertical movement may be set as a higher priority versus a real-time soil compaction level. In such instances, the force command may also increase the downforce of the ground engaging tool to minimize opener motion while allowing soil compaction to increase above a predefined range.

In various embodiments, the computing system 102 may additionally be configured to generate a variable gain based at least in part on one or more seeding parameters. As used herein, the variable gain includes a variable adapted to modulate a gain of a band-pass filter, which may have a fixed bandwidth. For instance, the variable gain of various examples is adapted to increase or decrease the gain of the band-pass filter based on the seeding parameters. The band-pass filter may be applied to the command signal to adjust a magnitude of the command signal thereby generating an adjusted command signal. In turn, the computing system 102 uses an algorithm, look-up table, chart, graph, and/or any other method to determine a force command to move the implement 10 to a position in order to achieve the target depth and/or the target depth range based on the adjusted command signal. The force command is then provided to the implement 10 to adjust a downforce setting of the implement 10.

In various instances, each of the seeding parameters may have varied effects on the actual depth of the implement 10 during operation. As such, an amount of gain for a first seeding parameter may be within a first spectrum and an amount of gain for a second seeding parameter may be within a second spectrum. For example, a first seeding parameter may be a field residue level and the second seeding parameter may be a seeder speed. In such instances, the second spectrum may have at least one of a greater upper limit or a lesser lower limit than the first spectrum. However, it will be appreciated that the first spectrum may have at least one of a greater upper limit or a lesser lower limit than the second spectrum and/or the first spectrum and the second spectrum may be generally equal without departing from the scope of the present disclosure.

In some examples, the amount of variable gain based on each seeding parameter may be at least partially varied based on one or more predefined sensitivity settings through a user interface 114 and/or automatically generated based on one or more inputs. In some instances, the one or more predefined sensitivity settings may be selected by the user based on the user's desire for the implement 10 to have various characteristics during operation. For example, a first sensitivity setting may allow for more aggressive corrections during operation of the implement 10 while a second sensitivity setting may allow for less aggressive correction during operation.

Additionally or alternatively, in various other implementations the computing system 102 may be configured to automatically and/or dynamically determine the gain amount. For example, the computing system 102 may be configured to determine the gain amount based on a pre-set value, the current seeding parameters, a previously provided sensitivity setting input, or a speed of the vehicle 12. In some examples, a speed sensor such as a global positioning system (GPS) is configured to measure the rate of travel of the vehicle 12 over a given distance. The computing system 102 may perform one or more runtime calculations to determine a particular gain amount to be applied to the command signal based on the measured speed of the vehicle 12. In other examples, the computing system 102 may use a look-up table to determine the particular gain amount based on the speed of the vehicle 12. In various examples, the computing system 102 is configured to increase the gain amount applied as the speed of the vehicle 12 increases and decrease the gain amount applied as the speed of the vehicle 12 decreases. However, in other examples, the gain amount may be increased as the speed of the vehicle 12 or the implement 10 decreases and decreased as the speed of the vehicle 12 or the implement 10 increases.

In several embodiments, the system 100 can provide a notification to the operator through the user interface 114 (either in the tractor or remotely) when the computing system 102 is unable to maintain the target depth and/or the target depth range based on the current seeding parameters. The system 100 can then give the operator an option of reducing ground speed to maintain optimum seeding performance or override the notification to continue seeding at the current speed. As such, the system 100 can provide a more optimal seeding performance in variable field conditions, reduce the need for an experienced operator to establish an initial downforce target setting, and support autonomous seeding and planting initiatives whereby the machine can set itself and continually adjust for optimum performance and overall productivity.

The computing system 102 may communicate with various components through a transceiver 120. For example, the transceiver 120 may be operably coupled with the engine 26 of the vehicle 12, the transmission 28 of the vehicle 12, and/or a control module 122 of the implement 10. The transceiver 120 may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services. Alternatively, a proprietary communications protocol may be utilized for communications between the computing system 102 and the control module 122.

In general, the control module 122 may correspond to any suitable processor-based device(s), such as a computing device or any combination of computing devices that are positioned on the vehicle 12 and/or the implement 10. In several embodiments, the control module 122 may include one or more processor(s) and associated memory device(s) configured to perform a variety of computer-implemented functions. In addition, the control module 122 may also include various other suitable components, such as a communications circuit or module, a network interface, one or more input/output channels, a data/control bus, and/or the like, to allow the control module 122 to be communicatively coupled to the other controller and/or to any of the various other system components described herein.

The control module 122 may also be communicatively coupled to the various sensors associated with each row unit 42 and/or the implement 10. For instance, as shown in FIG. 3, the control module 122 may be coupled to a downforce sensor 124 configured to monitor the downforce being applied through the row unit 42. In several embodiments, the downforce sensor 124 may correspond to one or more load sensor provided in operative association with one or more of the ground engaging components of the row unit 42. Alternatively, the downforce sensor 124 may correspond to a pressure sensor 126 configured to monitor the pressure of the fluid being supplied to the actuator 54, thereby providing an indication of the downforce being applied through the row unit 42.

Further, as shown in FIG. 3, the control module 122 may also be communicatively coupled to various other sensors, such as a depth sensor 128 and/or a vibration sensor 130 of each row unit 42. The depth sensor 128 may be configured to detect a depth of a component of the implement 10 within the soil, such as the row units 42. The vibration sensor 130 may be configured to monitor the vibrational motion of the row unit 42 as its being traversed across the ground. For instance, the vibration sensor 130 may correspond to an accelerometer configured to detect the magnitude of the vibration or bouncing of the row unit 42 on which it is installed.

In addition, system 100 may include one or more parameter sensors 132 that are configured to detect a seeding parameter(s). For example, the one or more parameter sensors 132 may include one or more imagers 134 configured to detect seedbed ridges, furrows, and/or any other suitable geographical or crop features present within the field. In this regard, the imager 134 may be provided in operative association with the implement 10 such that the imager 134 has a field of view or sensor detection range directed towards a portion of the field adjacent to the implement 10 and/or the row units 42. The imager 134 may correspond to any suitable sensing device configured to detect or capture image data or other vision-based data (e.g., point cloud data) associated with a seeding parameter within an associated field of view. For example, in several embodiments, the imager 134 may correspond to a suitable camera configured to capture images of the field, such as three-dimensional images of the soil surface or the plants present within the associated field of view. For instance, in several embodiments, the imager 134 may correspond to a stereographic camera having two or more lenses with a separate image sensor for each lens to allow the camera to capture stereographic or three-dimensional images. However, in alternative embodiments, the imager 134 may correspond to Light Detection and Ranging (LIDAR) sensor or any other suitable vision-based sensing device. Additionally, in some embodiments, the sensor may include a Radio Detection and Ranging (RADAR) sensor, an ultrasonic sensor, or any other suitable non-contact beam-based sensor.

Additionally, as shown in FIG. 3, the one or more acceleration sensors 136 may be configured to detect a parameter associated with movement or motion of the implement 10 relative to the work vehicle 12. For instance, in several embodiments, the acceleration sensor 136 may correspond to a gyroscope and/or an inertial motion unit (IMU). However, it should be appreciated that, in alternative embodiments, the acceleration sensor 136 may be configured as any suitable acceleration sensing device for detecting relative movement between the implement 10 and the work vehicle 12.

One of ordinary skill in the art would appreciate that, in alternative embodiments, the sensor may include any other suitable type of sensor and such sensor may be configured to detect any other suitable seeding parameter(s) of the implement 10. For example, in some embodiments, the sensor may include a suitable contact-based sensor, such as a potentiometric sensor, a load sensor, a torque sensor, a strain gauge(s), and/or the like.

Referring still to FIG. 3, the control module 122 may generally be configured to control the operation of one or more components of the implement 10. For instance, in several embodiments, the control module 122 may be configured to control the operation of one or more components that regulate the downforce applied through each row unit 42 and/or one or more components that adjust the operation of a seed meter. As shown in FIG. 3, in several embodiments, the control module 122 may be communicatively coupled to a valve 140 configured to regulate a supply of fluid (e.g., hydraulic fluid or air) to a corresponding downforce actuator 54 for each row unit 42. In such instances, by regulating the supply of fluid to the actuator 54, the control module 122 may control the downforce applied by the actuator 54 against the row unit 42. For instance, by reducing the pressure of the fluid supplied to the actuator 54, the piston rod 56 (FIG. 2) of the actuator 54 may be retracted, thereby reducing the downforce applied through the row unit 42. Similarly, by increasing the pressure of the fluid supplied to the actuator 54, the piston rod 56 may be extended, thereby increasing the downforce applied through the row unit 42.

In additional embodiments, the computing system 102 may be communicatively coupled to the engine 26 and/or the transmission 28 of the work vehicle 12. In such instances, the computing system 102 may be configured to adjust the operation of the engine 26 and/or the transmission 28 in a manner that increases, decreases, or maintains the ground speed of the work vehicle 12 and, thus, the ground speed of the tillage implement 10, such as by transmitting suitable control signals for controlling an engine 26 or speed governor associated with the engine 26 and/or transmitting suitable control signals for controlling the engagement/ disengagement of one or more clutches provided in operative association with the transmission 28.

Figure 4:
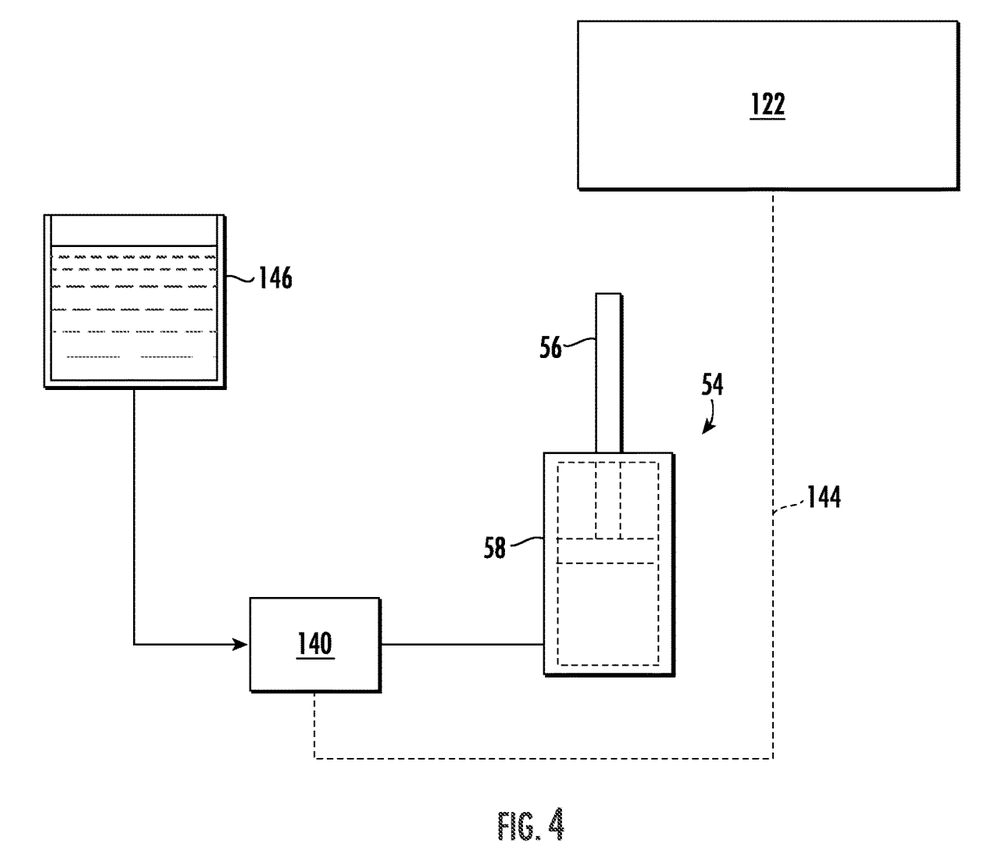
FIG. 4 illustrates a schematic view of a control module operably coupled with an actuator for adjusting downforce on a seeder in accordance with aspects of the present subject matter.

Referring now to FIG. 4, a schematic view of a control module 122 operably coupled with an actuator 54 for adjusting downforce on a seeder is illustrated in accordance with aspects of the present subject matter. In various embodiments, the computing system 102 may provide instructions to the control module 122 to control the operation of the actuator 54 to adjust the position of the rockshaft 50 relative to the toolbar 40 by extending or retracting the rod 56 of the actuator 54, thereby adjusting the down pressure being applied on the disc openers 44. For instance, the control module 122 may control the operation of the actuator 54 such that the rod 56 is retracted when the monitored seeding parameter exceeds a seeding parameter range to reduce the downforce being applied on the disc openers 44. Similarly, the control module 122 may control the operation of the actuator 54 such that the rod 56 is extended when the monitored seeding parameter is below a seeding parameter range to increase the downforce being applied on the disc openers 44.

It should be appreciated that maintaining the downforce applied to the disc opener 44 to maintain a seeding parameter may maintain a constant penetration depth of the disc openers 44 despite changing soil conditions (e.g., changes in soil hardness). For example, in some instances, the seeding parameter range may correspond to an operator selected seeding parameter range. In this regard, the operator may select a desired seeding parameter target and/or corresponding range based on the object or seed to be disposed within the field. Additionally or alternatively, the seeding parameter range may correspond to a manufacturer seeding parameter range.

In other embodiments, the computing system 102 may be configured to compare the monitored seeding parameter values received from the sensors to a predetermined range defined for the parameter. For example, in the event that the monitored parameter value(s) exceeds a maximum value for the given parameter range or falls below a minimum down pressure load for the given range (thereby indicating that at least one of a target deposition depth may be too shallow or too deep or a target deposition spacing of the seeds deposited by the implement 10 may be too close or too far), the computing system 102 may be configured to instruct the control module 122 to operate the actuator 54 to adjust the downforce on the disc openers 44 as described above.

In accordance with aspects of the present disclosure, the control module 122 may be configured to control the operation of the actuator 54 by actively controlling the operation of an associated valve(s) 140, such as one or more pressure regulating valves (PRVs). For instance, in the illustrated example, the control module 122 is communicatively coupled to the valve(s) 140 (e.g., as indicated by dashed line 144) such that the control module 122 may control the operation of the valve(s) 140 in a manner that regulates the pressure of hydraulic fluid supplied to the actuator 54 from a corresponding reservoir 146. In such an example, the pressure of the fluid supplied from the valve 140 may be directly proportional to the amount of extension/retraction of the actuator 54, thereby allowing the control module 122 to control the displacement of the actuator 54. It should be appreciated that, in alternate embodiments, the computing system 102 may be configured to be coupled to any other suitable component(s) for automatically controlling the operation of the actuator 54.

Figure 5:
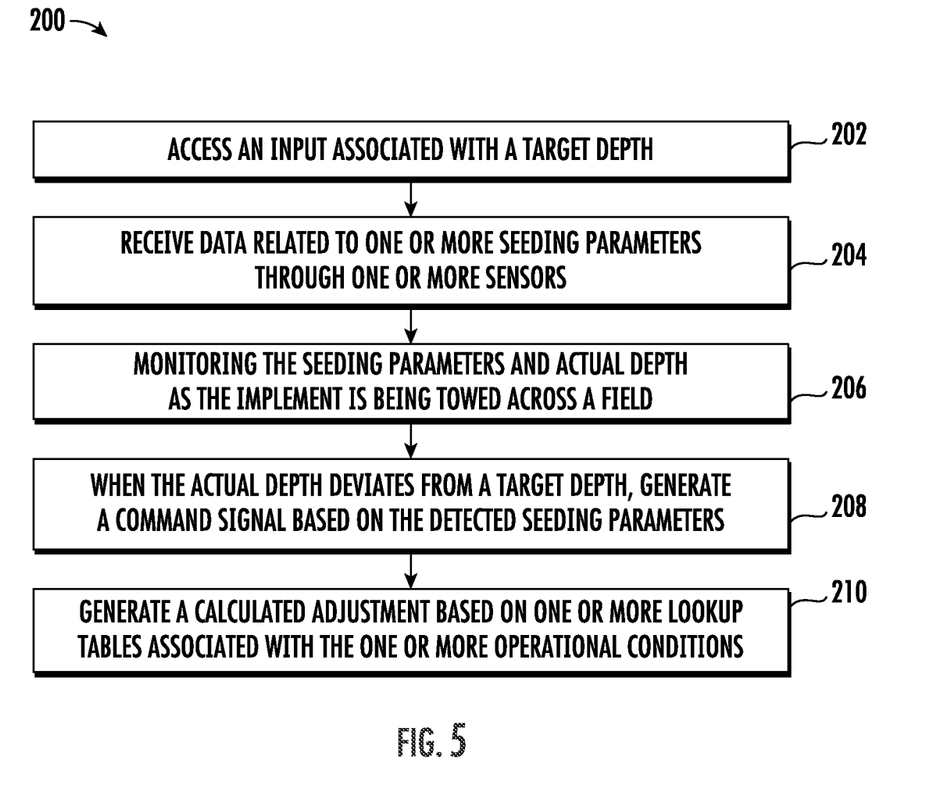
FIG. 5 illustrates a method for providing downforce control for an agricultural implement in accordance with aspects of the present subject matter.

Referring now to FIG. 5, a flow diagram of a method 200 for providing downforce control for an agricultural implement including a computing system is illustrated in accordance with aspects of the present subject matter. In general, the method 200 will be described herein with reference to the work vehicle 12 and the seeding implement 10 shown in FIGS. 1 and 2, as well as the various system components shown in FIG. 3. However, it should be appreciated that the disclosed method 200 may be implemented with work vehicles and/or tillage implements having any other suitable configurations and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving an input associated with a target depth of a ground engaging tool of an implement. For instance, the input may be provided by the operator of the vehicle, a trained technician since the operator may not have sufficient knowledge to understand how best to optimize the seeding parameters adjustments, and/or remotely by any other entity. In various instances, the input may be received through the user interface and/or through a transceiver of the computing system.

Additionally, at (204), the method 200 may include receiving data related to one or more seeding parameters through one or more sensors. For instance, the computing system may be communicatively coupled to one or more sensors. Such sensors may be provided in operative association with the implement, a row unit of the implement, and/or any other component of the implement to detect at least one of a soil compaction level, a soil percent moisture, a field residue levels/amounts, an opener movement (e.g., ride quality, a minimum ground contact percentage), a field traffic, a weight of a work vehicle or the implement, a soil type, a soil composition, a topsoil depth, a subsoil depth, a field elevation, a tire traction, sensor data from one or more load sensors, a seeder speed, and/or any other suitable condition that affects the performance of a seeder to deposit one or more seeds at a target deposition depth or target depth range. The data may be transmitted from the sensors to the computing system for subsequent processing.

At (206), the method 200 may include monitoring the seeding parameters and an actual depth of the seeder as the seeder traverses a field. In various examples, the computing system may be communicatively coupled to one or more depth sensors. Such sensors may be provided in operative association with the implement, a row unit of the implement, and/or any other component of the implement to detect an actual depth of the implement within the soil.

At (208), when the actual seeding depth deviates from the target depth and/or the target depth range, the method 200 may generate a command signal based on the detected seeding parameters.

At (210), based on the inputted seeding parameters and the command signal, the method 200 generates a force command that is provided to the control module, which causes various portions of the implement to move to the desired implement position. In some instances, the method 200 can use an algorithm, look-up table, chart, graph, and/or any other method to determine a force command in order to achieve the target depth and/or the target depth range based on the detected seeding parameters. For example, in some examples, the parameter sensor may be an imager that is configured to determine a field roughness factor. In such instances, the force command can be altered based on the determined field roughness factor. Likewise, the parameter sensor may be any sensor capable of detecting a soil compaction level. In such instances, and the force command is varied as the soil compaction level changes.

Therefore, an operator, a technician, and/or any other entity can choose different seeding parameters and the computing system automatically adjusts the system settings accordingly for optimum performance based on one or more seeding parameters, which can include field conditions, work vehicle state, etc. Moreover, it will be appreciated that the method provided herein may provide multiple downforce control strategies based on seeding parameters (such as field conditions) that are either manually selected by the user or via automatically sensing based on feedback in the control system. Further, it will be appreciated that the strategies set forth herein may also be used in other control systems for seeding and planting operations including, but not limited to, residue manager downforce, seed depth control, closing/packing system downforce or opener trip force setpoints.

Figure 6:
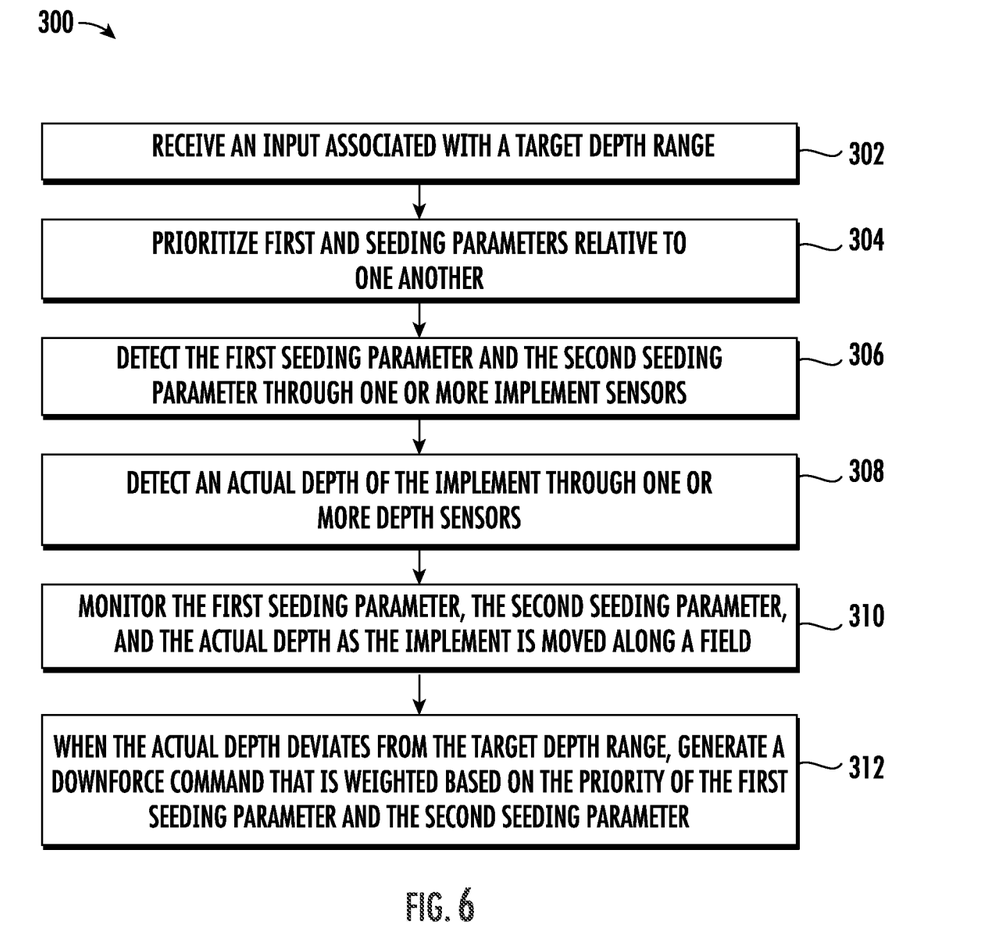
FIG. 6 illustrates a method for providing downforce control for a seeder having a plurality of row units.

Referring now to FIG. 6, a flow diagram of a method 300 for providing downforce control for an agricultural implement including a computing system is illustrated in accordance with aspects of the present subject matter. In general, the method 300 will be described herein with reference to the work vehicle 12 and the seeding implement 10 shown in FIGS. 1 and 2, as well as the various system components shown in FIG. 3. However, it should be appreciated that the disclosed method 300 may be implemented with work vehicles and/or tillage implements having any other suitable configurations and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Furthermore, it will be appreciated that, when possible, the steps set forth in method 300 may be combined with any of the steps set forth in method 300 without departing from the scope of the present disclosure.

As shown in FIG. 6, at (302), the method 300 may include receiving an input associated with a target depth range of the row unit into an underlying field. For instance, the input may be provided by the operator of the vehicle, a trained technician since the operator may not have sufficient knowledge to understand how best to optimize the seeding parameters adjustments, and/or remotely by any other entity. In various instances, the input may be received through the user interface and/or through a transceiver of the computing system.

At (304), the method 300 may include prioritizing first and second seeding parameters. For example, in some embodiments, the first seeding parameter is an amount of vertical movement of the implement and the second seeding parameter is a soil compaction level. However, each of the first seeding parameter and the second seeding parameter may additionally or alternatively be may include at least one of a soil compaction level, a soil percent moisture, a field residue levels/amounts, an opener movement (e.g., ride quality, a minimum ground contact percentage), a field traffic, a weight of a work vehicle or the implement, a soil type, a soil composition, a topsoil depth, a subsoil depth, a field elevation, a tire traction, sensor data from one or more load sensors, a seeder speed, and/or any other suitable condition that affects the performance of a seeder to deposit one or more seeds at a target deposition depth or target depth range. In various embodiments, the first seeding parameter may have a first upper threshold and a first lower threshold. Likewise, the second seeding parameter may have a second upper threshold and a second lower threshold.

At (306), the method 300 may include detecting the first seeding parameter and the second seeding parameter through one or more parameter sensors. For instance, the one or more parameter sensors may be provided in operative association with the implement, a row unit of the implement, the vehicle, and/or any other component to detect at least the first and second seeding parameters. The data may be transmitted from the sensors to the computing system for subsequent processing.

At (308), the method 300 may include detecting an actual depth of the seeder as the seeder traverses a field. In various examples, the computing system may be communicatively coupled to one or more depth sensors. Such sensors may be provided in operative association with the implement, a row unit of the implement, and/or any other component of the implement to detect an actual depth of the implement within the soil.

At (310), the method can include monitoring the first seeding parameter, the second seeding parameter, and the actual depth of the implement based on the data provided at (306) and (308). At (312), when the actual seeding depth deviates from the target depth range, the method 200 may generate a downforce command that is weighted based on the priority of the first seeding parameter relative to the second seeding parameter.

In some instances, the method system may include generating a command signal based on a differential between the target depth range and the actual depth range. The command signal, the first and second seeding parameters, and the prioritization of the first and second seeding parameters may be inputted into an algorithm. In turn, a force command is generated that is provided to control module, which causes various portions of the implement to move to the desired implement position. As such, when the first seeding parameter is identified as a higher priority, a first force command may be generated. When the second seeding parameter is identified as a higher priority, a second force command may be generated. In various embodiments, with all other factors being equal, the first force command may differ from the second force command.

Figure 7:
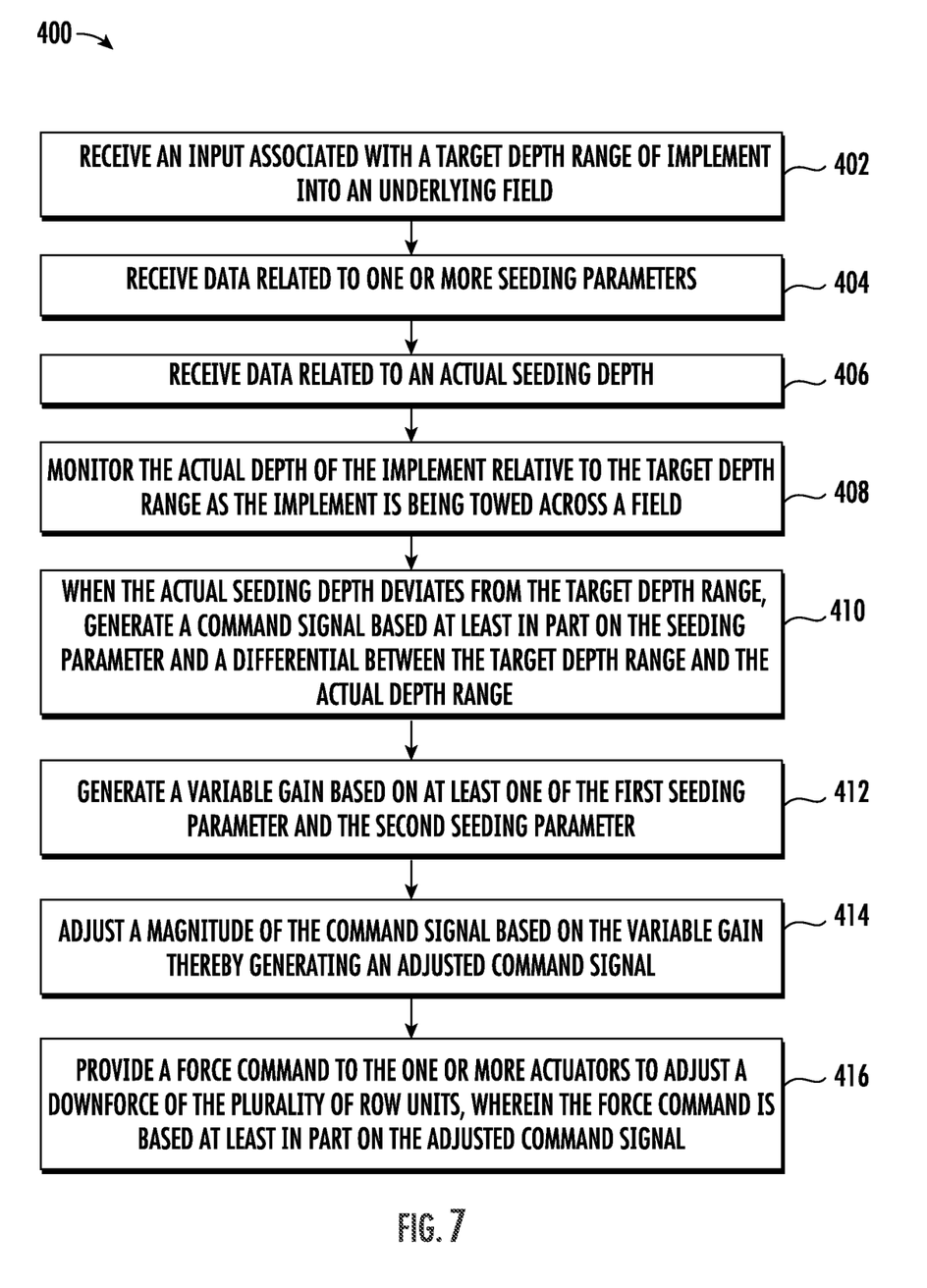
FIG. 7 illustrates a method for providing downforce control for a seeder having a plurality of row units.

Referring now to FIG. 7, a flow diagram of a method 400 for providing downforce control for an agricultural implement including a computing system is illustrated in accordance with aspects of the present subject matter. In general, the method 400 will be described herein with reference to the work vehicle 12 and the seeding implement 10 shown in FIGS. 1 and 2, as well as the various system components shown in FIG. 3. However, it should be appreciated that the disclosed method 400 may be implemented with work vehicles and/or tillage implements having any other suitable configurations and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As show in FIG. 7, at (402), the method 400 may include receiving an input associated with a target depth range of the row unit into an underlying field. For instance, the input may be provided by the operator of the vehicle, a trained technician since the operator may not have sufficient knowledge to understand how best to optimize the seeding parameters adjustments, and/or remotely by any other entity. In various instances, the input may be received through the user interface and/or through a transceiver of the computing system.

At (404), the method 400 may include receiving data related to one or more seeding parameters. In various examples, the data may include at least one of a soil compaction level, a soil percent moisture, a field residue levels/amounts, an opener movement (e.g., ride quality, a minimum ground contact percentage), a field traffic, a weight of a work vehicle or the implement, a soil type, a soil composition, a topsoil depth, a subsoil depth, a field elevation, a tire traction, sensor data from one or more load sensors, a seeder speed, and/or any other suitable condition that affects the performance of a seeder to deposit one or more seeds at a target deposition depth or target depth range.

At (406), the method 400 may include receiving data related to an actual seeding depth. In various examples, the computing system may be communicatively coupled to one or more depth sensors. Such sensors may be provided in operative association with the implement, a row unit of the implement, and/or any other component of the implement to detect an actual depth of the implement within the soil.

At (408), the method 400 may include monitoring the seeding parameters and an actual depth of the seeder as the seeder traverses a field. At (410), when the actual seeding depth deviates from the target depth range, the method 400 can include generating a command signal. The command signal can include a differential between the target depth range and the actual depth range.

At (412), based on the inputted seeding parameters and the command signal, the method 400 generates a force command that is provided to the control module, which causes various portions of the implement to move to the desired implement position. In some instances, the method 200 can use an algorithm, look-up table, chart, graph, and/or any other method to determine a force command in order to achieve the target depth and/or the target depth range based on the detected seeding parameters.

At (414), the method 400 can include generating a variable gain based on the one or more seeding parameters. As used herein, the variable gain includes a variable adapted to modulate a gain of a band-pass filter, which may have a fixed bandwidth. For instance, the variable gain of various examples is adapted to increase or decrease the gain of the band-pass filter. The band-pass filter may be applied to the command signal to adjust a magnitude of the command signal.

In some examples, the method may include receiving, through a user interface, an input corresponding to a sensitivity setting. The sensitivity settings adjust the sensitivity of the system or the implement to disturbances by adjusting the gain based on predefined setting. For example, a first sensitivity setting may allow for more aggressive changes relative to a second sensitivity setting. In such instances, the variable gain is a first amount when a first sensitivity setting is activated and a second amount when a second sensitivity setting is activated, the first amount being different from the second amount.

In various examples, the computing system may be configured to automatically and/or dynamically determine the gain amount. For example, the computing system may be configured to determine the gain amount based on a pre-set value, the seeding parameters of the implement, the operational conditions of the vehicle, a previously provided sensitivity input, or a speed of the vehicle. In some instances, a speed sensor, such as a global positioning system (GPS), is configured to measure the rate of travel of the vehicle over a given distance. The computing system may perform one or more runtime calculations to determine a particular gain amount to be applied to the command signal based on the measured speed of the vehicle. In some examples, the computing system is configured to increase the gain amount applied as the speed of the vehicle increases and decrease the gain amount applied as the speed of the vehicle decreases. However, in other examples, the gain amount may be increased as the speed of the vehicle decreases and decreased as the speed of the vehicle increases.

Furthermore, the computing system may perform one or more runtime calculations to determine a particular gain amount to be applied to the command signal based on the measured speed of the implement. In some instances, the variable gain value may be set to a maximum value if the implement speed is greater than an upper threshold, the variable gain may be set to a minimum value if the implement speed is less than a lower threshold, and the variable gain may be linearly interpolated when the implement speed is equal to or within a range defined between the upper threshold and the lower threshold.

At (416), the method 400 may include adjusting a magnitude of the force command based on the variable gain thereby generating an adjusted command signal. In various examples, adjusting the magnitude includes applying the band-pass filter having a fixed bandwidth. The force command may be used to instruct an actuator to move the implement relative to the substantially horizontal orientation to adjust a depth of a ground engaging tool of the implement into the soil. In various examples, applying the band-pass filter at different gain values varies the percentage of the disturbance to be compensated by movement of the implement. For instance, during large disturbances, the adjusted command signal may direct the actuator to move the implement to compensate for all (or most of) the disturbance. In contrast, during small disturbances, the adjusted command signal may direct the actuator to move the implement to compensate for a fraction (e.g., 10%) of the disturbance. Such an implementation avoids any undesirable effects of noise within the system during small disturbances.

In some instances, the variable gain can be set to a maximum value if one or more seeding parameters are greater than an upper threshold, the variable gain is set to a minimum value if one or more seeding parameters is less than a lower threshold, and the variable gain is linearly interpolated when the seeding parameter is equal to or within a range defined between the upper threshold and the lower threshold for each of the one or more seeding parameters.

It will be appreciated that any of the seeding parameters may have a defined gain range. For example, an amount of gain for the first seeding parameter is within a first spectrum and the amount of gain for the second seeding parameter is within a second spectrum, the second spectrum having at least one of a greater upper limit or a lesser lower limit than the first spectrum. In addition, in some cases, one or more of the seeding parameters may not be correlated to a variable gain.

In various examples, the amount of variable gain may be at least partially varied based on one or more predefined sensitivity settings through a user interface 114 and/or automatically generated based on one or more inputs. In some instances, the one or more predefined sensitivity settings may be selected by the user based on the user's desire for the implement to have various characteristics during operation. For example, a first sensitivity setting may allow for more aggressive corrections during operation of the implement while a second sensitivity setting may allow for less aggressive correction during operation. In such examples, an amount of gain for the first seeding parameter may be within a first spectrum with the first spectrum defining a first gain range in the first sensitivity setting and a second gain range in the second sensitivity setting. In some instances, the second gain range is different than the first gain range.

At (416), the method 400 may include providing the adjusted force command to the one or more actuators to adjust a downforce of the plurality of row units. As discussed above, the actuator can adjust a seeding depth of the implement to compensate for variances between an actual seeding depth and a target depth range. The force command causes the actuator to move one or more disc openers either further above or further into a ground surface. In particular, energy or fluid pressure generated by the system 100 is delivered to the actuator causing the actuator to extend or retract to a predetermined position causing the depth of the one or more disc openers to be altered. In various examples, the linear actuator can be, for example, an electromagnetic linear motor, a hydraulic cylinder, or a pneumatic cylinder.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for providing downforce control, the system comprising:
a seeder including a plurality of row units, each row unit being configured to deposit seeds within a ground as the seeder traverses a field;
one or more actuators operably coupled with each of the plurality of row units and configured to adjust a downforce of the plurality of row units;
a sensor configured to detect one or more seeding parameters; and
a computing system provided in operative association with the seeder, the computing system being configured to control the operation of the plurality of row units, wherein the computing system is further configured to:
generate a force command for the one or more actuators to adjust a downforce of the plurality of row units;
generate a variable gain based at least in part on one or more seeding parameters, wherein the variable gain modulates a gain of a band-pass filter; and
adjust a magnitude of the force command thereby generating an adjusted force command.

2. The system of claim 1, wherein the one or more seeding parameters includes a first seeding parameter and a second seeding parameter, and wherein the computing system is further configured to:
receive a priority of the first seeding parameter relative to the second seeding parameters; and
alter the force command based on the priority of the first seeding parameter relative to the second seeding parameter.

3. The system of claim 1, wherein an amount of variable gain is at least partially varied based on one or more predefined sensitivity settings.

4. The system of claim 1, wherein the one or more seeding parameters includes a first seeding parameter and a second seeding parameter, and wherein an amount of gain for the first seeding parameter is within a first spectrum and the amount of gain for the second seeding parameter is within a second spectrum, the second spectrum having at least one of a greater upper limit or a lesser lower limit than the first spectrum.

5. The system of claim 1, wherein an amount of variable gain is increased when a seeder speed is increased and decreased when the seeder speed is decreased.

6. The system of claim 1, wherein the one or more seeding parameters includes at least one of may include at least one of a soil compaction level, a soil percent moisture, a field residue levels/amounts, an opener movement, a field traffic, a soil type, a soil composition, a topsoil depth, a subsoil depth, a field elevation, a tire traction, sensor data from one or more load sensors, or a seeder speed.

7. The system of claim 1, further comprising:
a user interface configured to receive one or more notifications from the computing system.

8. The system of claim 1, wherein the computing system includes a lookup table that relates the one or more seeding parameters to the force command.

9. The system of claim 1, wherein the one or more parameter sensors include an imager that is configured to determine a field roughness factor, and wherein the force command is altered based on the field roughness factor.

10. A method for providing downforce control for an agricultural implement including a computing system, the method comprising:
receiving, with the computing system, an input associated with a target depth range of a row unit into an underlying field;
receiving, through one or more parameter sensors, data related to a seeding parameter;
receiving, through one or more depth sensors, data related to an actual seeding depth;
monitoring, with the computing system, the actual seeding depth relative to the target depth range;
when the actual seeding depth deviates from a defined range, generating a command signal based on a differential between the actual seeding depth and the target depth range;
generating a force command for one or more actuators to adjust a downforce of the row unit, wherein the force command is based at least in part on the command signal;
generating a variable gain based at least in part on the seeding parameter;
adjusting a magnitude of the force command based on the variable gain thereby generating an adjusted force command; and
providing the adjusted force command to the actuator to adjust the downforce of the row unit.

11. The method of claim 10, further comprising:
receiving, through a user interface, an input corresponding to a sensitivity setting, wherein the variable gain is a first amount when a first sensitivity setting is activated and a second amount when a second sensitivity setting is activated, the first amount being different from the second amount.

12. The method of claim 10, wherein the variable gain modulates a gain of a band-pass filter.

13. The method of claim 10, wherein the variable gain is set to a maximum value if the seeding parameter is greater than an upper threshold, the variable gain is set to a minimum value if the seeding parameter is less than a lower threshold, and the variable gain is linearly interpolated when the seeding parameter is equal to or within a range defined between the upper threshold and the lower threshold.

14. The method of claim 10, wherein the seeding parameter is an implement speed, and the variable gain is set to a maximum value if the implement speed is greater than an upper threshold, the variable gain is set to a minimum value if the implement speed is less than a lower threshold, and the variable gain is linearly interpolated when the implement speed is equal to or within a range defined between the upper threshold and the lower threshold.

15. The method of claim 10, wherein receiving, through the one or more parameter sensors, data related to the seeding parameter further comprises detecting vertical movement of the row unit, and the variable gain is increased as the vertical movement of the row unit increases.

16. The method of claim 10, wherein receiving, through the one or more parameter sensors, data related to the seeding parameter further comprises detecting a soil compaction level, and the command signal is varied as the soil compaction level changes.

17. A method for providing downforce control for a seeder having a plurality of row units, the seeder including a computing system configured to control an operation of the plurality of row units, the method comprising:
receiving, with the computing system, an input associated with a target depth range of the row unit into an underlying field and a sensitivity setting;
receiving, through one or more parameter sensors, data related to a speed of the seeder;
receiving, through one or more depth sensors, data related to an actual seeding depth;
monitoring, with the computing system, the actual depth relative to the target depth range;
when the actual seeding depth deviates from a defined range, generating a command signal based on a differential between the actual seeding depth and the target depth range;
generating a force command for one or more actuators to adjust a downforce of the plurality of row units, wherein the force command is based at least in part on the command signal;
generating a variable gain based at least in part on a seeder speed;
adjusting a magnitude of the force command based on the variable gain thereby generating an adjusted force command; and
providing the adjusted force command to the one or more actuators to adjust a downforce of the plurality of row units.

18. The method of claim 17, wherein an amount of variable gain is increased when the seeder speed is increased and decreased when the seeder speed is decreased.

19. The method of claim 17, further comprising:
receiving a first sensitivity setting or a second sensitivity setting, wherein an amount of gain is greater when the first sensitivity setting is received than when the second sensitivity setting is received.

* * * * *